United States Patent
Shinba et al.

(10) Patent No.: US 10,598,303 B2
(45) Date of Patent: Mar. 24, 2020

(54) BUNDLING BAND

(71) Applicant: KYOCERA Document Solutions Inc., Osaka (JP)

(72) Inventors: Minoru Shinba, Osaka (JP); Yuichi Sugiyama, Osaka (JP)

(73) Assignee: KYOCERA Document Solutions, Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/411,929

(22) Filed: May 14, 2019

(65) Prior Publication Data

US 2019/0353284 A1      Nov. 21, 2019

(30) Foreign Application Priority Data

May 18, 2018   (JP) .................................. 2018-096244

(51) Int. Cl.
   *A44B 19/30*   (2006.01)
   *A44B 19/26*   (2006.01)
   *F16L 3/233*   (2006.01)
   *F16L 3/137*   (2006.01)

(52) U.S. Cl.
   CPC .............. *F16L 3/2336* (2013.01); *F16L 3/137* (2013.01)

(58) Field of Classification Search
   CPC ......... F16L 3/2336; F16L 3/137; F16L 3/233; Y10T 24/1498; B65D 63/1027
   See application file for complete search history.

(56) References Cited

U.S. PATENT DOCUMENTS

| | | | | |
|---|---|---|---|---|
| 5,159,728 A * | 11/1992 | Bingold | ................. | E05B 75/00 24/16 PB |
| 5,802,888 A * | 9/1998 | Parsons | ..................... | A61F 5/37 128/879 |
| 5,967,316 A * | 10/1999 | Abbruzzese | .......... | B65B 13/027 140/93 A |
| 6,044,525 A * | 4/2000 | Sastre | ................ | B65D 63/1018 24/16 PB |
| 6,196,033 B1 * | 3/2001 | Dowdle | .................. | E05B 75/00 24/16 PB |
| 6,588,074 B2 * | 7/2003 | Galkiewicz | ........ | A44B 18/0053 24/16 PB |

(Continued)

FOREIGN PATENT DOCUMENTS

JP      2000-076935 A      3/2000
WO      2008-G34341   *   6/2008

*Primary Examiner* — Robert Sandy
*Assistant Examiner* — Louis A Mercado
(74) *Attorney, Agent, or Firm* — IP Business Solutions, LLC (57) ABSTRACT

A bundling band includes: a first band portion having a first band, and a first head portion connected to a first end thereof; and a second band portion having a second band, and a second head portion connected to first and second ends thereof. In the first head portion and second head portion, a first insertion hole (insertable with the second band, second head portion, and first band) and a second insertion hole (insertable with the second band) are formed, respectively. The first insertion hole is provided with a locking mechanism locking drawing-out of the inserted first band by engaging with one of engaging grooves. The second insertion hole is provided with a locking mechanism locking drawing-out of the inserted second band by engaging with one of engaging grooves.

5 Claims, 6 Drawing Sheets

(56) References Cited

U.S. PATENT DOCUMENTS

| | | | |
|---|---|---|---|
| 6,718,597 B2 * | 4/2004 | Geiger | B65D 63/1072 |
| | | | 24/16 PB |
| 7,437,804 B1 * | 10/2008 | Geiger | B65D 63/1072 |
| | | | 24/16 PB |
| 7,789,414 B2 * | 9/2010 | Blackburn | B60R 21/213 |
| | | | 24/16 PB |
| 9,266,654 B1 * | 2/2016 | Scott | B65D 63/1027 |
| 9,868,573 B1 * | 1/2018 | Chen | H02G 3/32 |

* cited by examiner

BUNDLING BAND

INCORPORATION BY REFERENCE

This application claims priority to Japanese Patent Application No. 2018-096244 filed on May 18, 2018, the entire contents of which are incorporated by reference herein.

BACKGROUND

The present disclosure relates to a bundling band for bundling electric wires.

Many electric wires are used in insides of image forming apparatuses such as copying machines, multi-function machines, MFPs, and printers. In addition, multipolar connectors are also increasingly used and thereto a large number of electric wires can be connected. The more multipolarized the connectors become, greater amounts of pressure are required when mating male and female connectors.

SUMMARY

The present disclosure proposes further improvement of the foregoing technique.

A bundling band according to one aspect of the present disclosure includes a first band portion and a second band portion. The first band portion has a first band on which engaging grooves being serrated are formed, and a first head portion connected to a first end of the first band. The second band portion has a second band on which engaging grooves being serrated are formed, and a second head portion connected to a first end of the second band, the second head portion being connected to a second end of the first band to which the first head portion is unconnected. In the first head portion, a first insertion hole insertable with the second band, the second head portion, and the first band is formed, and in the second head portion, a second insertion hole insertable with the second band is formed. The first insertion hole is provided with a locking mechanism that locks drawing-out of the first band having been inserted by engaging with one of the engaging grooves, and the second insertion hole is provided with a locking mechanism that locks drawing-out of the second band having been inserted by engaging with one of the engaging grooves.

DETAILED DESCRIPTION

Hereafter, embodiments of the present disclosure will be detailed with reference to the drawings. In the embodiments described hereunder, the configuration showing the same function is denoted by the same reference numeral.

First Embodiment

Figure 1A:
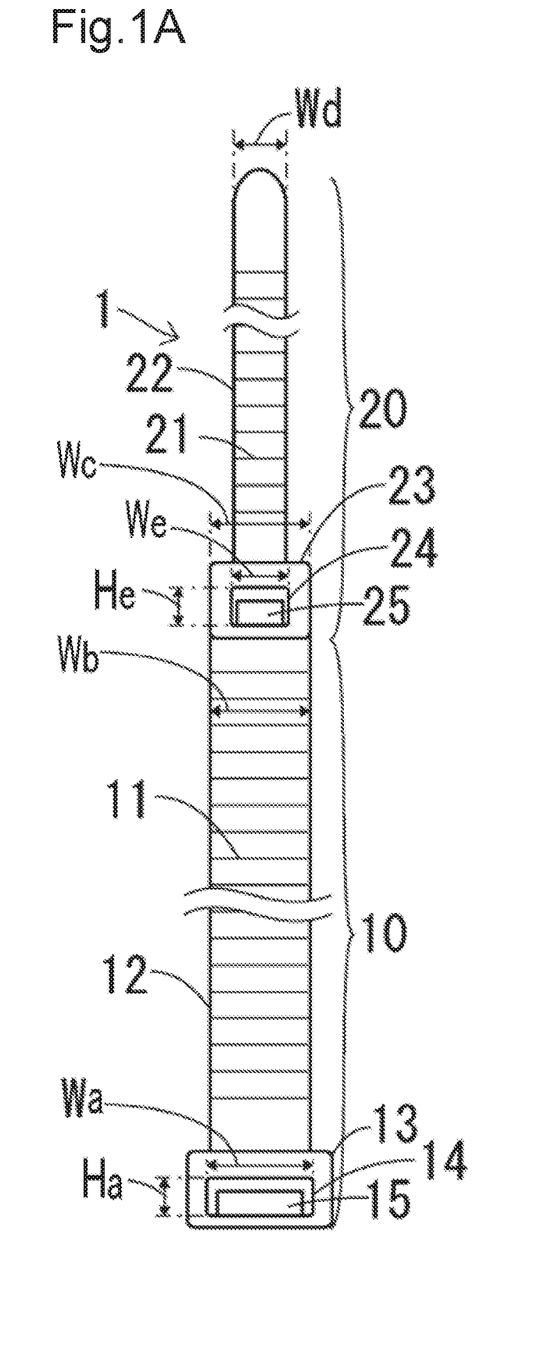
FIGS. 1A and 1B are diagrams showing configurations of a first embodiment of a bundling band according to the present disclosure.
Figure 1B:
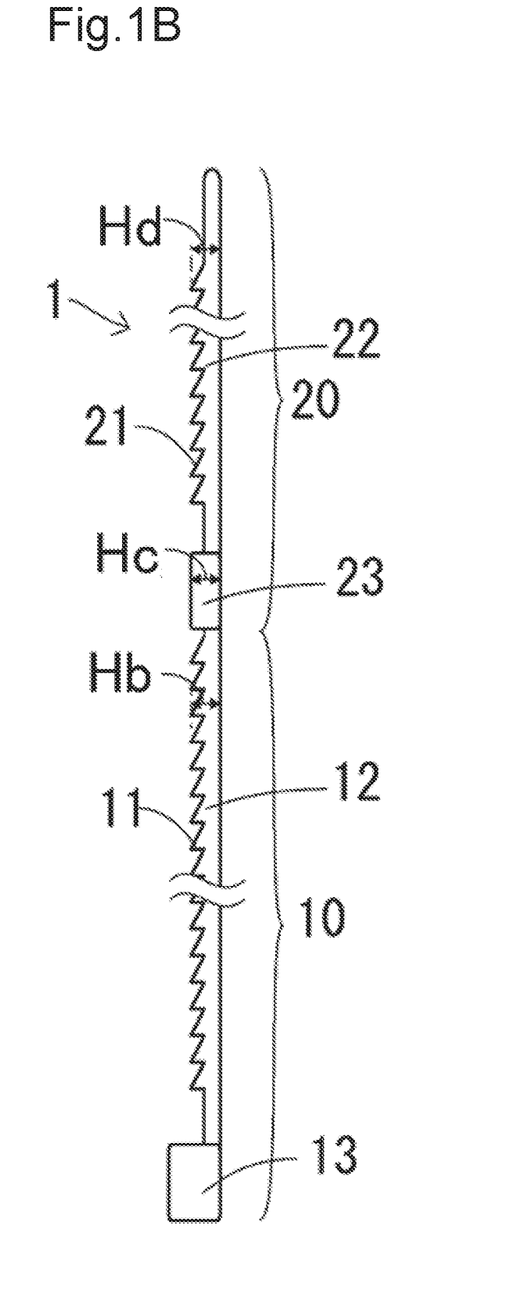

In a bundling band 1 according to the first embodiment, with reference to FIGS. 1A and 1B, a first band portion 10 bundling electric wires is integrally formed, by resin molding, with a second band portion 20 that bundles electric wires different from the electric wires that the first band portion 10 bundles.

The first band portion 10 has a first band 12 on which engaging grooves 11 being serrated are formed, and a first head portion 13 connected to a first end of the first band 12.

The second band portion 20 has a second band 22 on which engaging grooves 21 being serrated are formed, and a second head portion 23 connected to a first end of the second band 22. The second head portion 23 is connected to a second end of the first band 12 of the first band portion 10, the second end being the side where the first head portion 13 is unconnected: the second end of the second band 22 where the second head portion 23 is unconnected is the released end.

In the first head portion 13 of the first band portion 10, a first insertion hole 14 insertable with the second band 22, the second head portion 23, and the first band 12 is formed. That is, as shown in FIGS. 1A and 1B, the width Wa of the first insertion hole 14 is set larger than the width Wb of the first band 12, the width Wc of the second head portion 23, and the width Wd of the second band 22. The height Ha of the first insertion hole 14 is set larger than the thickness Hb of the first band 12, the thickness Hc of the second head portion 23, and the thickness Hd of the second band 22.

In the present embodiment, the width Wb of the first band 12 and the width Wc of the second head portion 23 are set to have the same width. There is no limitation as to the width Wb of the first band 12 so long as it is smaller than the width Wa of the first insertion hole 14. However, by setting the width Wb of the first band 12 to have the same width as the width Wc of the second head portion 23, the first band 12 is prevented from rattling right and left in the first insertion hole 14 during the bundling.

An inner wall of the first insertion hole 14 is provided with a first engaging claw 15 as a locking mechanism that locks drawing-out of the first band 12 having been inserted. The first engaging claw 15 is provided in a swingable manner: in the case of being moved in an insertion direction, the second band 22, the second head portion 23, and the first band 12 become insertable by the swinging. In the case of moving the first band 12 in a drawing-out direction, the first engaging claw 15 engages with one of the engaging grooves 11, and the first band 12 cannot be drawn out.

In the present embodiment, the engaging grooves 11 of the first band 12 and the engaging grooves 21 of the second band 22 are formed in the same shape except for the width. Therefore, also in the case of moving the second band 22 in the drawing-out direction, the first engaging claw 15 engages with one of the engaging grooves 21, and the second band 22 cannot be drawn out.

In the second head portion 23 of the second band portion 20, a second insertion hole 24 insertable with the second band 22 is formed. That is, as shown in FIGS. 1A and 1B, the width We of the second insertion hole 24 is set larger than the width Wd of the second band 22, and the height He of the second insertion hole 24 is set larger than the thickness Hd of the second band 22.

An inner wall of the second insertion hole 24 is provided with a second engaging claw 25 as a locking mechanism that locks drawing-out of the second band 22 having been inserted. The second engaging claw 25 is provided in the swingable manner: in the case of being moved in the insertion direction, the second band 22 becomes insertable by the swinging. In the case of moving the second band 22 in the drawing-out direction, the second engaging claw 25 engages with one of the engaging grooves 21, and the second band 22 cannot be drawn out.

Figure 2:
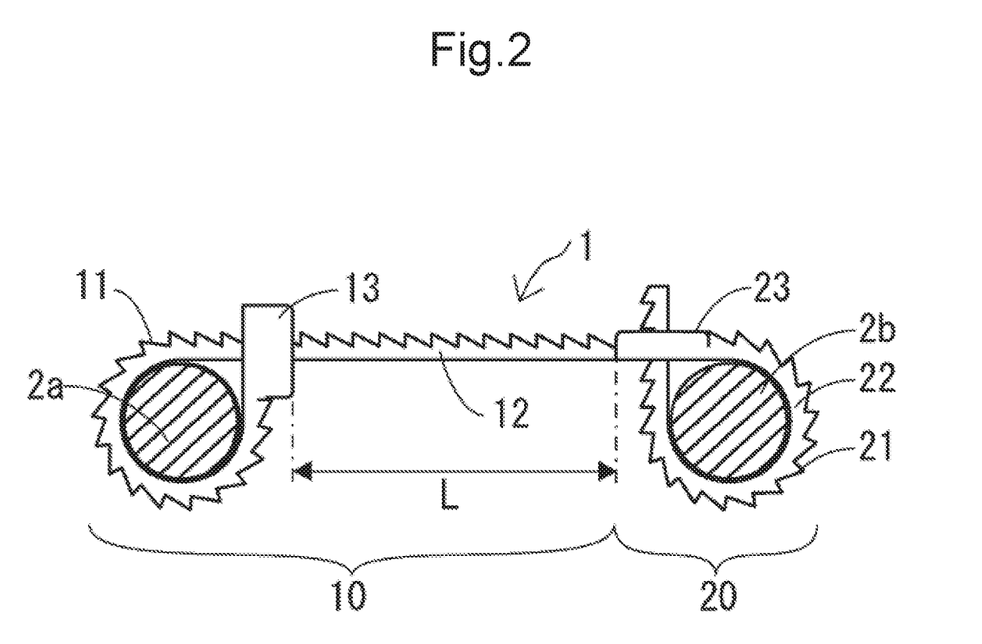
FIG. 2 is a diagram showing an example of bundling electric wires by the bundling band shown in FIGS. 1A and 1B.
Figure 3A:
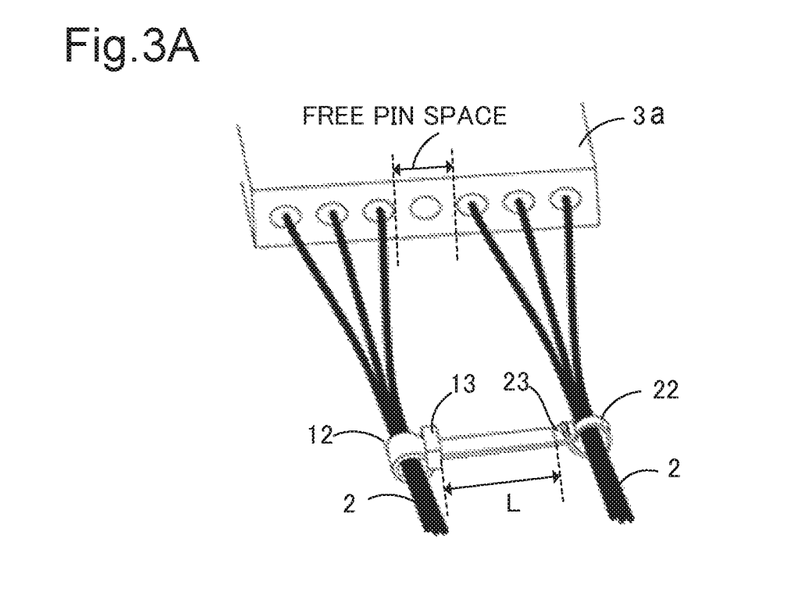
FIGS. 3A and 3B are diagrams showing examples of bundling electric wires connected to connectors by the bundling band shown in FIGS. 1A and 1B.
Figure 3B:
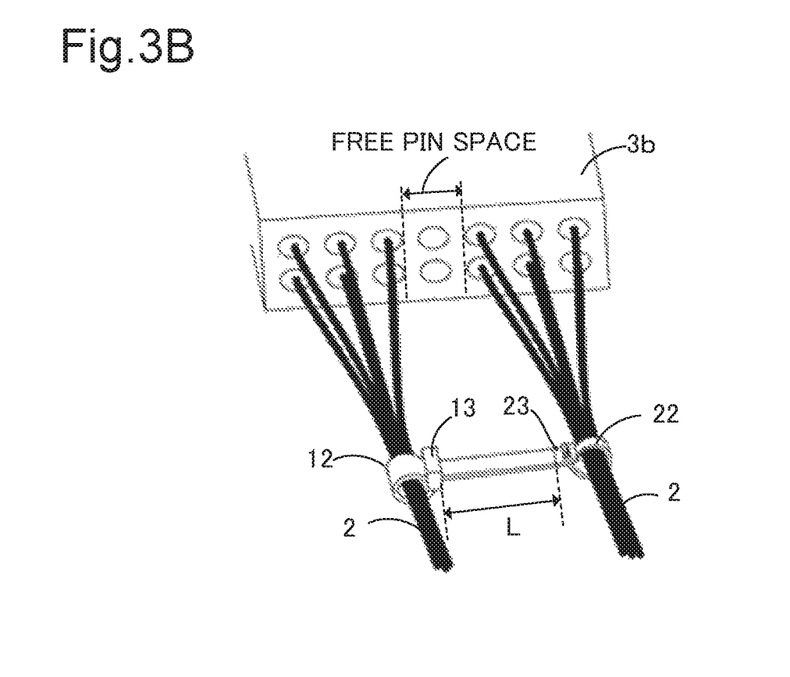

As shown in FIG. 2, in bundling electric wires 2a by the first band portion 10 and electric wires 2b by the second band portion 20, firstly, the second band portion 20 (the second band 22 and the second head portion 23) and the first band 12 are inserted into the first insertion hole 14 formed in the first head portion 13 of the first band portion 10 to thereby bundle the electric wires 2a by the first band 12. Then, the second band 22 is inserted into the second insertion hole 24 formed in the second head portion 23 of the second band portion 20 to thereby bundle the electric wires 2b by the second band 22. This makes the surplus length L of the first band 12 not used in bundling the electric wires 2a become the interval between the electric wires 2a and the electric wires 2b. Accordingly, the electric wires 2a and electric wires 2b can be bundled at interval. Here, the surplus length portion of the second band 22 is being cut in FIG. 2. The electric wires 2a and the electric wires 2b are respectively illustrated by hatched circles in FIG. 2, but each are actually formed of a plurality of electric wires, as shown in FIGS. 3A and 3B. Each of the electric wires 2a and the electric wires 2b, however, may be of a single electric wire.

FIG. 3A shows an example where a connector 3a of seven pins is arranged to have a free pin in the center and by the bundling band 1 according to the present embodiment, three electric wires 2 on both sides connected to the connector 3a are bundled at interval. By such arrangement, two sets of the electric wires 2 (each set has three electric wires) are bundled while leaving the surplus length L of the first band 12 as the interval, so that the electric wires 2 do not intrude into a free pin space. Accordingly, it is possible, without being bothered by the electric wires 2, to apply a pressure to the center portion (free pin space) of the connector 3a and insert the connector 3a.

FIG. 3B shows an example where a connector 3b of two sets of seven pins is arranged to have free pins in the center and by the bundling band 1 according to the present embodiment, six electric wires 2 on both sides connected to the connector 3b are bundled at interval. In such case also, two sets of the electric wires 2 (each set has six electric wires) are bundled while leaving the surplus length L of the first band 12 as the interval, so that the electric wires 2 do not intrude into a free pin space. Accordingly, it is possible, without being bothered by the electric wires 2, to apply a pressure to the center portion (free pin space) of the connector 3b and insert the connector 3b.

Incidentally, in general, because electric wires connected to connectors are bundled in one, pressure cannot be applied to the center portions and it is difficult to apply sufficient pressures.

In contrast, the present embodiment provides the bundling band capable of bundling the electric wires connected to the connector into a plurality of sets at intervals. That is, the present embodiment is capable of providing advantageous effect in which while leaving the length of the surplus portion of the first band as the intervals, the electric wires connected to the connector can be bundled to a plurality of sets at intervals.

Second Embodiment

Figure 4A:
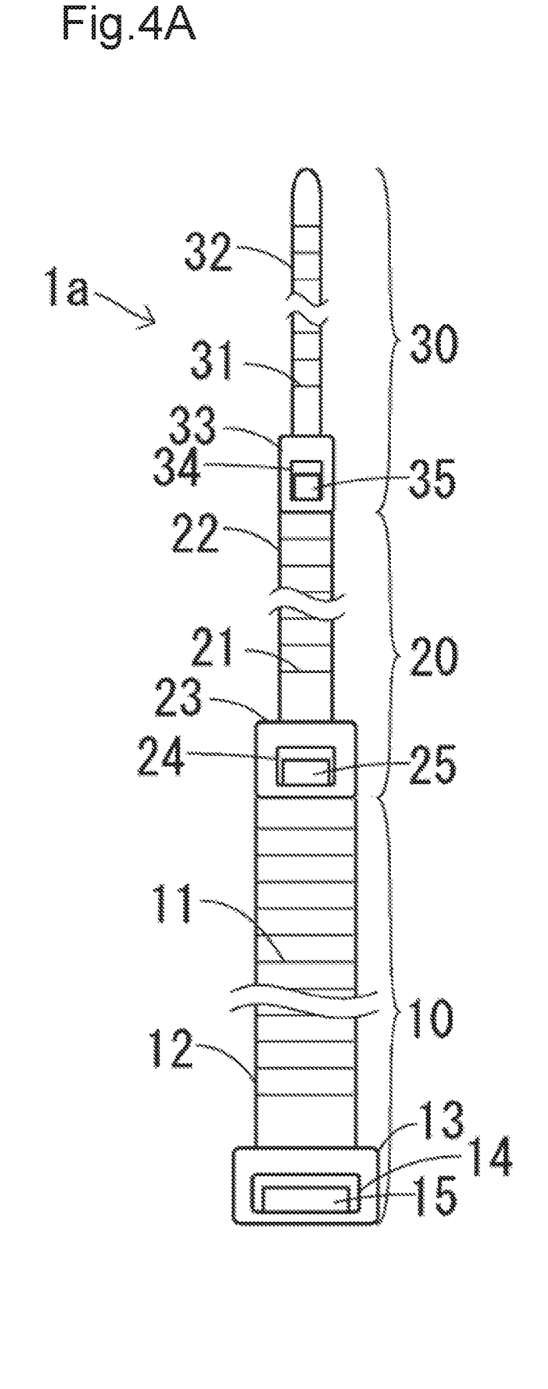
FIGS. 4A and 4B are diagrams showing configurations of a second embodiment of the bundling band according to the present disclosure.
Figure 4B:
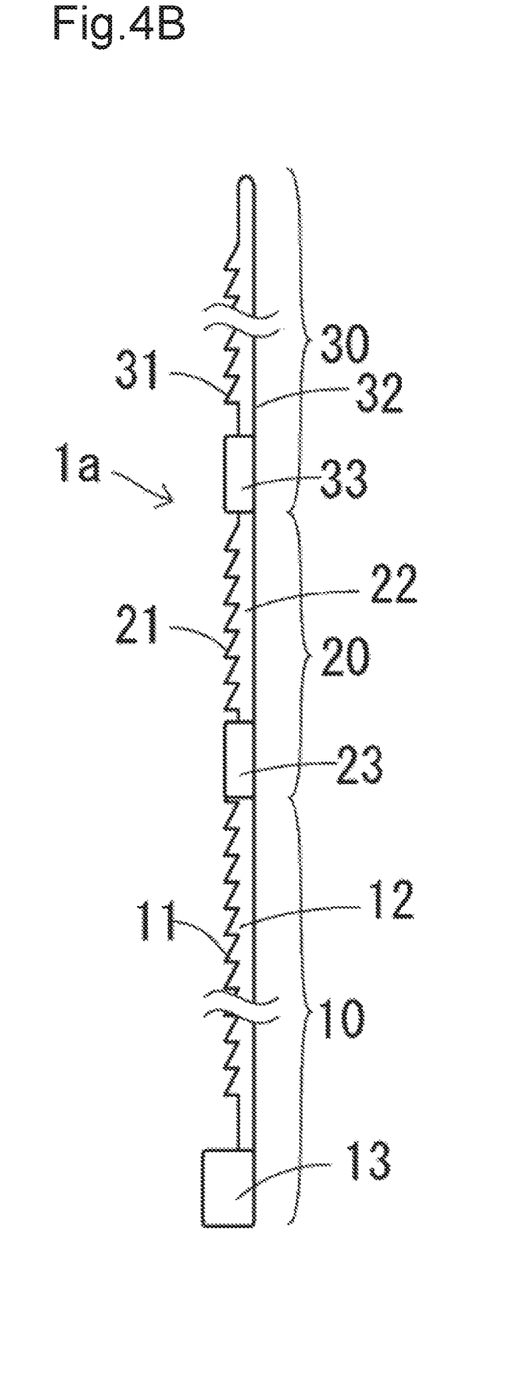

With reference to FIGS. 4A and 4B, a bundling band 1a according to the second embodiment has, in addition to the configurations of the first embodiment, a configuration in which a third band portion 30 bundling electric wires different from the electric wires that the first band portion 10 and the second band portion 20 bundle is integrally formed by resin molding.

The third band portion 30 has a third band 32 on which engaging grooves 31 being serrated are formed, and a third head portion 33 connected to a first end of the third band 32. The third head portion 33 is connected to a second end of the second band 22 of the second band portion 20, the second end being the side where the second head portion 23 is unconnected. The second end of the third band 32 where the third head portion 33 is unconnected is the released end.

The third head portion 33 is formed of a width and a height insertable with the first insertion hole 14 formed in the first head portion 13 of the first band portion 10 and the second insertion hole 24 formed in the second head portion 23 of the second band portion 20. In the third head portion 33, a third insertion hole 34 insertable with the third band 32 is formed and an inner wall of the third insertion hole 34 is provided with a third engaging claw 35 as a locking mechanism that locks drawing-out of the first band 32 having been inserted.

In the present embodiment, the engaging grooves 11 of the first band 12, the engaging grooves 21 of the second band 22, and the engaging grooves 31 of the third band 32 are formed in a same shape except for the width. Therefore, also in the case of moving the third band 32 in the drawing-out direction, the first engaging claw 15 and the second engaging claw 25 engage with one of the engaging grooves 21 and one of the engaging grooves 31, and the third band 32 cannot be drawn out.

Figure 5:
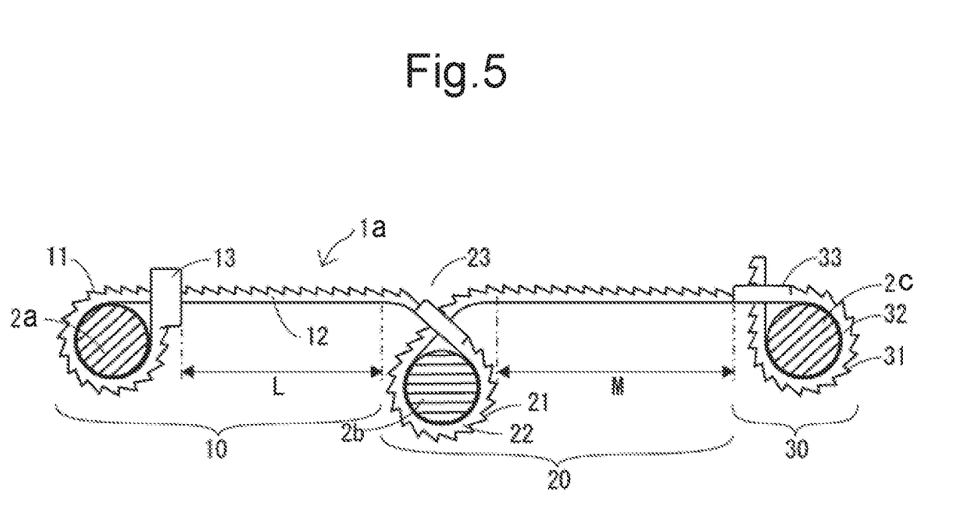
FIG. 5 is a diagram showing an example of bundling electric wires by the bundling band shown in FIGS. 4A and 4B.

As shown in FIG. 5, in bundling the electric wires 2a by the first band portion 10, the electric wires 2b by the second band portion 20, and electric wires 2c by the third band portion 30, firstly, the third band portion 30 (the third band 32 and the third head portion 33), the second band portion 20 (the second band 22 and the second head portion 23), and the first band 12 are inserted into the first insertion hole 14 formed in the first head portion 13 of the first band portion 10 to thereby bundle the electric wires 2a by the first band 12. Next, the third band portion 30 (the third band 32 and the third head portion 33) and the second band 22 are inserted into the second insertion hole 24 formed in the second head portion 23 of the second band portion 20 to thereby bundle the electric wires 2b by the second band 22. Then, the third band 32 is inserted into the third insertion hole 34 formed in the third head portion 33 of the third band portion 30 to thereby bundle the electric wires 2c by the third band 32. This makes the surplus length L of the first band 12 not used in bundling the electric wires 2a become the interval between the electric wires 2a and the electric wires 2b, and a surplus length M of the second band 22 not used in bundling the electric wires 2b become the interval between the electric wires 2b and the electric wires 2c. Accordingly, the electric wires 2a, the electric wires 2b, and the electric wires 2c can be bundled at intervals. Here, the surplus length portion of the third band 32 is being cut in FIG. 5. The electric wires 2a, the electric wires 2b, and the electric wires 2c are respectively illustrated by hatched circles in FIG. 5, but each are actually formed of the plurality of electric wires. Each of the electric wires 2a, the electric wires 2b, and the electric wires 2c, however, may be of a single electric wire.

Figure 6A:
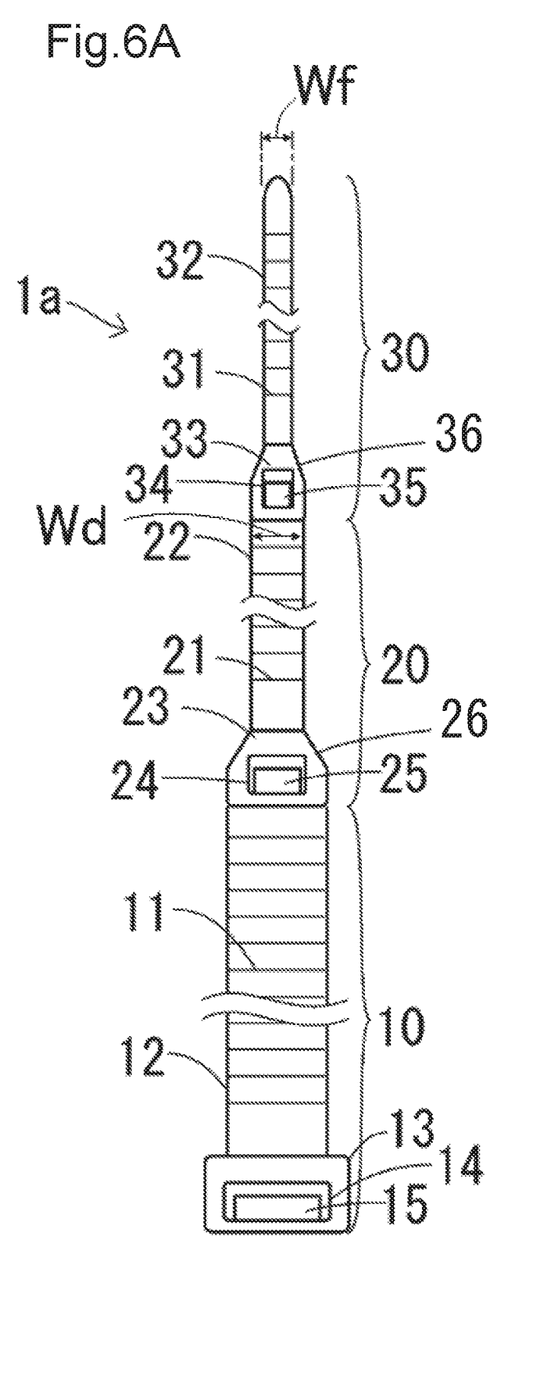
FIGS. 6A and 6B are diagrams showing another exemplary embodiment of the second embodiment of the bundling band according to the present disclosure.
Figure 6B:
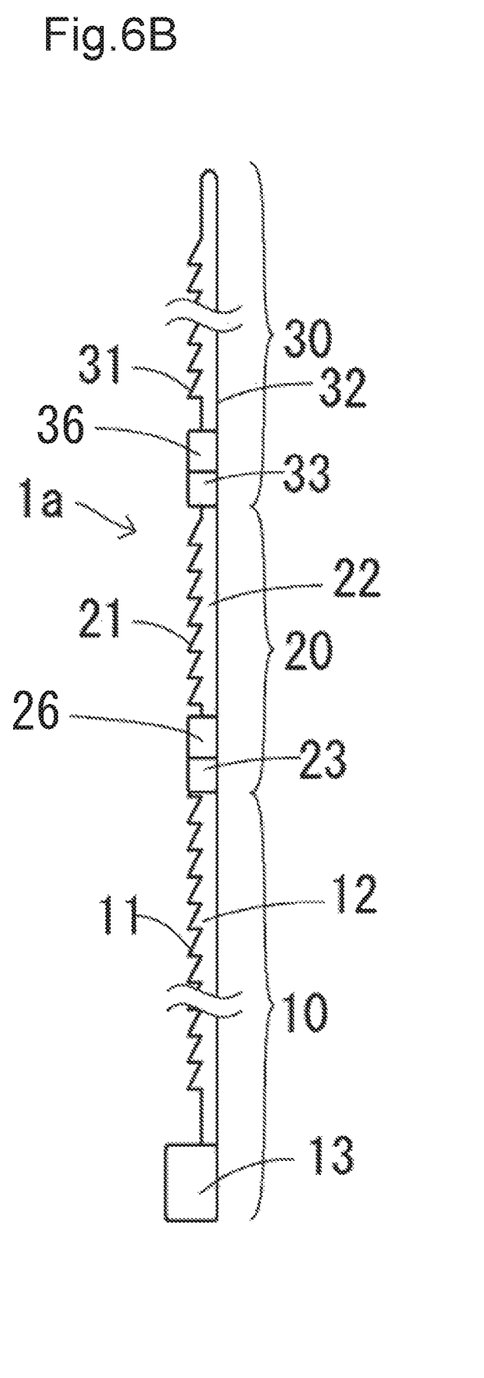

As shown in FIGS. 6A and 6B, the second head portion 23 and the third head portion 33 may have slant portions 26 and slant portions 36, respectively: the slant portions 26 slant from the width Wd of the second band 22 to the width Wb of the first band 12, and the slant portions 36 slant from the width Wf of the third band 32 to the width Wd of the second band 22. In such case, the insertion of the first band 12 into the first insertion hole 14 is guided by the slant portions 26, and the insertion of the second band 22 into the second insertion hole 24 is guided by the slant portions 36.

There may be provided fourth or subsequent band portions like the third band portion 30.

As described thus far, according to the first embodiment, the first band portion 10 and the second band portion 20 are provided: the first band portion 10 has the first band 12 on which the engaging grooves 11 being serrated are formed and the first head portion 13 connected to the first end of the first band 12, and second band portion 20 has the second band 22 on which the engaging grooves 21 being serrated are formed and the second head portion 23 connected to the first end of the second band 22, the second head portion 23 being connected to the second end of the first band 12 to which the first head portion 13 is unconnected. In the first head portion 13, the first insertion hole 14 insertable with the second band 22, the second head portion 23, and the first band 12 is formed, and in the second head portion 23, the second insertion hole 24 insertable with the second band 22 is formed. The first insertion hole 14 is provided with the first engaging claw 15 as the locking mechanism that locks drawing-out of the first band 12 having been inserted by engaging with one of the engaging grooves 11, and the second insertion hole 24 is provided with the second engaging claw 25 as the locking mechanism that locks drawing-out of the second band 22 by engaging with one of the engaging grooves 21.

This configuration can bundle, while leaving the surplus length L of the first band 12 as the interval, the electric wires 2 connected to the connectors 3a and 3b into two sets at interval.

In the first embodiment, the width Wb of the first band 12 and the width Wc of the second head portion 23 are set to have the same width.

This configuration can prevent the first band 12 from rattling right and left in the first insertion hole 14 during bundling.

In another configuration example of the first embodiment, as shown in FIGS. 6A and 6B, the second head portion 23 has the slant portions 26 slanting from the width Wd of the second band 22 to the width Wb of the first band 12.

With this configuration, the insertion of the first band 12 into the first insertion hole 14 can be guided by the slant portions 26, and the insertion is facilitated thereby.

Furthermore, in the above described embodiments, the drawing-out of the second band 22 is locked by the locking mechanism (the first engaging claw 15) of the first insertion hole 14.

With this configuration, also by the locking mechanism (the first engaging claw 15) of the first insertion hole 14 the second band 22 can be locked and the electric wires 2 can be bundled. Accordingly, depending on the number and thickness of the wires 2 to be bundled, various measures can be made.

In addition, according to the second embodiment, the third band portion 30 is provided: the third band portion 30 has the third band 32 on which the engaging grooves 31 being serrated are formed and the third head portion 33 connected to the first end of the third band 32, the third head portion 33 being connected to the second end of the second band 22 to which the second head portion 23 is unconnected. The third head portion 33 is formed of the width and the height insertable with the first insertion hole 14 and the second insertion hole 24. In the third head portion 33, the third insertion hole 34 insertable with the third band 32 is formed and the third insertion hole 34 is provided with the third engaging claw 35 as the locking mechanism that locks drawing-out of the first band 32 having been inserted by engaging with one of the engaging grooves 31.

This configuration can bundle the electric wires 2 connected to the connectors 3a and 3b into three sets at intervals while leaving the surplus length L of the first band 12 and the surplus length M of the second band 22 as the respective intervals.

In the second embodiment, the width Wd of the second band 22 and the width of the third head portion 33 are set to have the same width.

This configuration can prevent the second band 22 from rattling right and left in the second insertion hole 24 during bundling.

In another configuration example of the second embodiment, as shown in FIGS. 6A and 6B, the third head portion 33 has the slant portions 36 slanting from the width Wf of the third band 32 to the width Wd of the second band 22.

With this configuration, the insertion of the second band 22 into the second insertion hole 24 can be guided by the slant portions 36, and the insertion is facilitated thereby.

Furthermore, in the second embodiment, the drawing-out of the third band 32 is locked by the locking mechanism (the first engaging claw 15) of the first insertion hole 14 and the locking mechanism (the second engaging claw 25) of the second insertion hole 24.

With this configuration, also by the locking mechanism (the first engaging claw 15) of the first insertion hole 14 or the locking mechanism (the second engaging claw 25) of the second insertion hole 24, the third band 32 can be locked and the electric wires 2 can be bundled. Accordingly, depending on the number and thickness of the wires 2 to be bundled, various measures can be made.

The present disclosure is not limited to the embodiments described above and it is clear that various modifications thereto can be made within the scope of the technical idea of the present disclosure. The number, position, shape, and so on of the above-mentioned constituent members are not limited to the above-mentioned embodiments, but can be made the number, position, shape, and so on suitable for carrying out the present disclosure. In each of the drawings, similar structural elements are given the same numerals.

The structures and configurations described in the above embodiments with reference to FIGS. 1A to 6B are merely illustrative and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:
1. A bundling band comprising:
a first band portion having a first band on which engaging grooves being serrated are formed, and a first head portion connected to a first end of the first band; and a second band portion having a second band on which engaging grooves being serrated are formed, and a second head portion connected to a first end of the second band, the second head portion being connected to a second end of the first band to which the first head portion is unconnected, wherein in the first head portion, a first insertion hole insertable with the second band, the second head portion, and the first band is formed, and in the second head portion, a second insertion hole insertable with the second band is formed, and the first insertion hole is provided with a locking mechanism that locks drawing-out of the first band having been inserted by engaging with one of the engaging grooves, and the second insertion hole is provided with a locking mechanism that locks drawing-out of the second band having been inserted by engaging with one of the engaging grooves, the bundling band further comprising a third band portion having a third band on which engaging grooves being serrated are formed, and a third head portion connected to a first end of the third band, the third head portion being connected to a second end of the second band to which the second head portion is unconnected, wherein the third head portion is formed of a width and a height insertable with the first insertion hole and the second insertion hole, in the third head portion, a third insertion hole insertable with the third band is formed, and the third insertion hole is provided with a locking mechanism that locks drawing-out of the third band having been inserted by engaging with one of the engaging grooves.

2. The bundling band according to claim 1, wherein the second band and the third head portion are set to have a same width.

3. The bundling band according to claim 2, wherein the third head portion has slant portions gradually increasing from a width of the third band to the width of the second band.

4. The bundling band according to claim 1, wherein the drawing-out of the third band is locked by the locking mechanism of the first insertion hole and by the locking mechanism of the second insertion hole.

5. The bundling band according to claim 1, wherein the engaging groove of the first band, the engaging groove of the second band, and the engaging groove of the third band are formed in a same shape.

* * * * *